Sept. 30, 1947. P. NAEHER ET AL 2,428,090
INFRA-RED TREATMENT OF CEREAL GERMS
Filed May 17, 1944 8 Sheets-Sheet 2
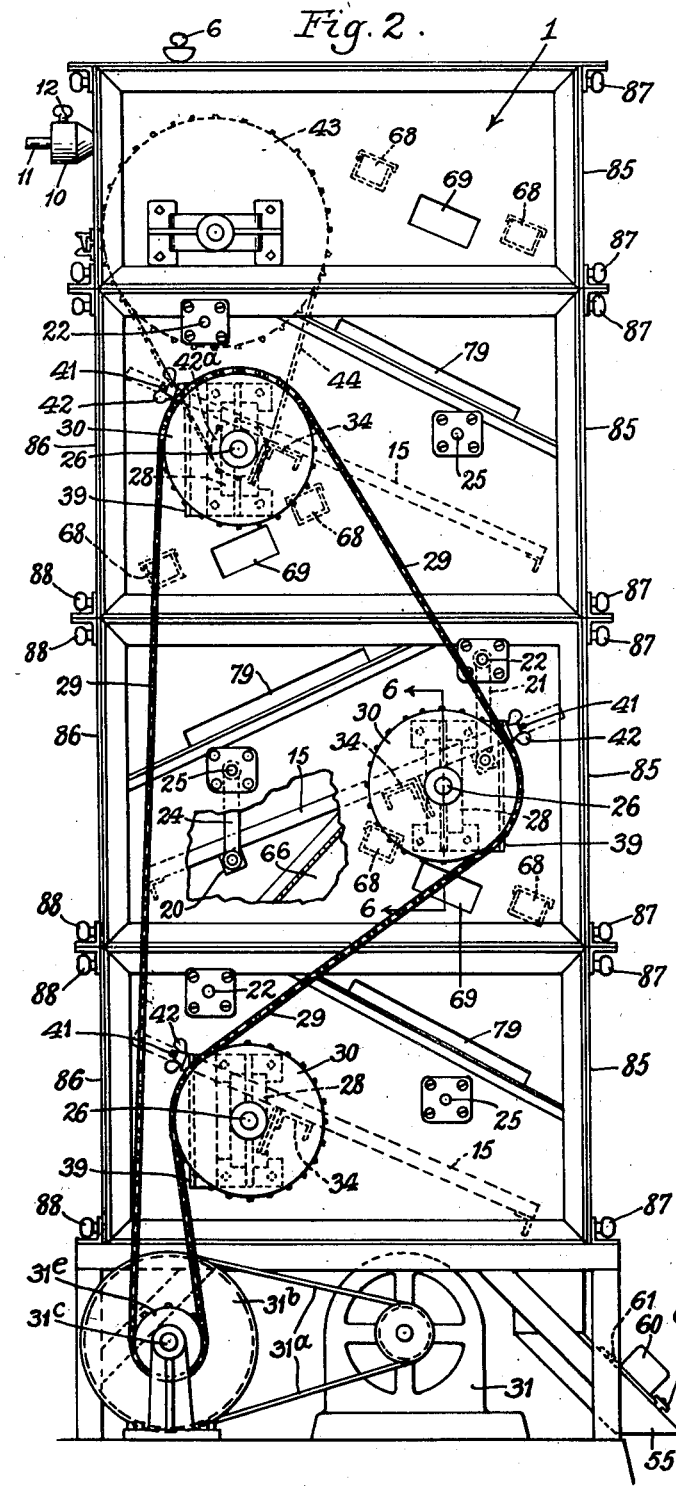
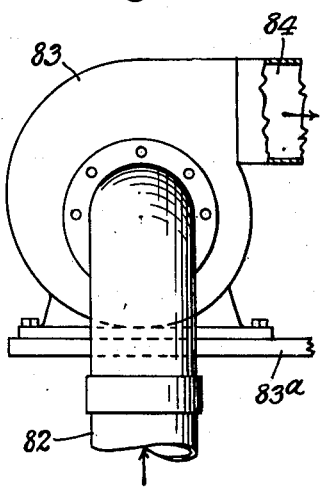
Inventors
Paul Naeher
Maurice T. Williams
by Parker & Carter
Attorneys.

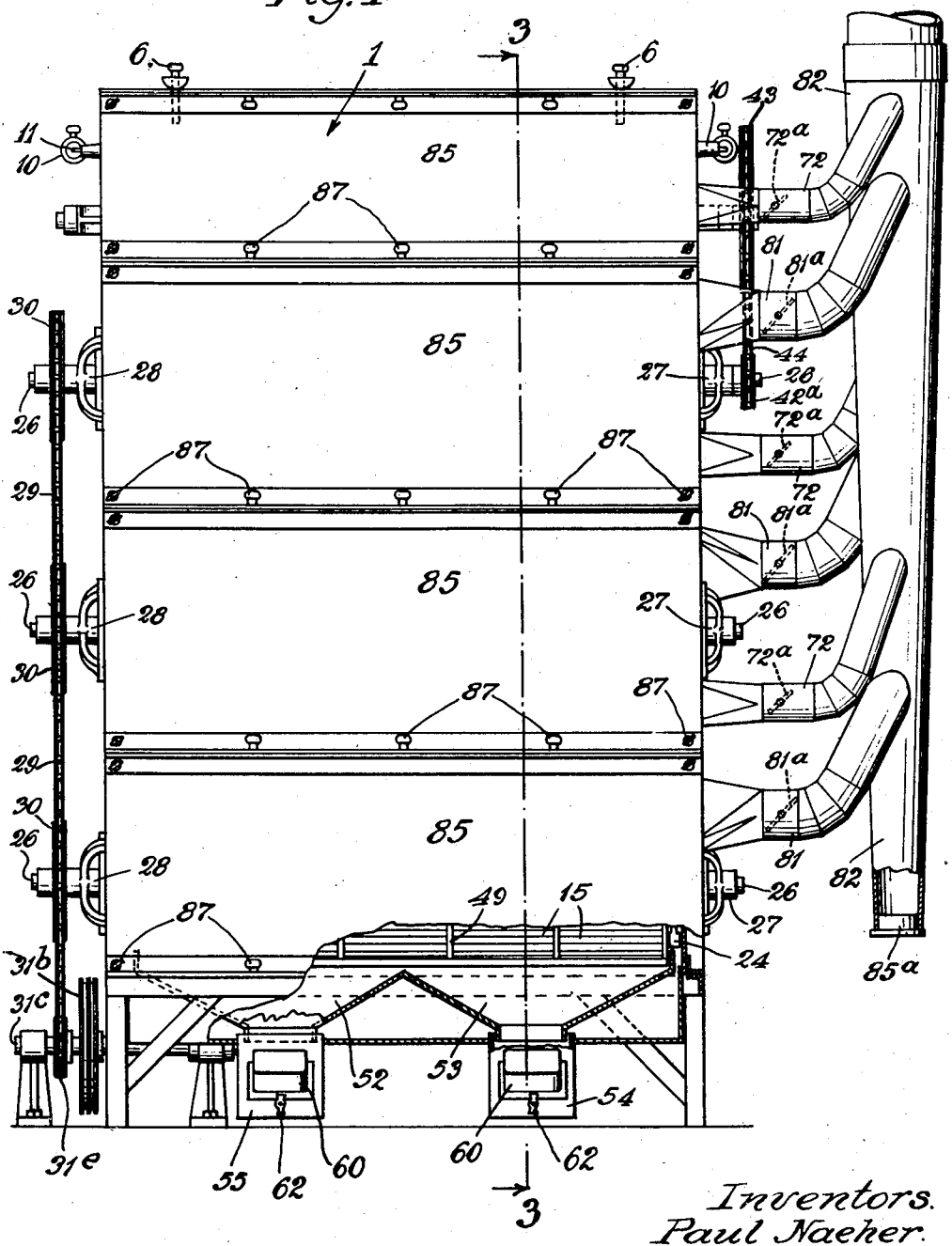

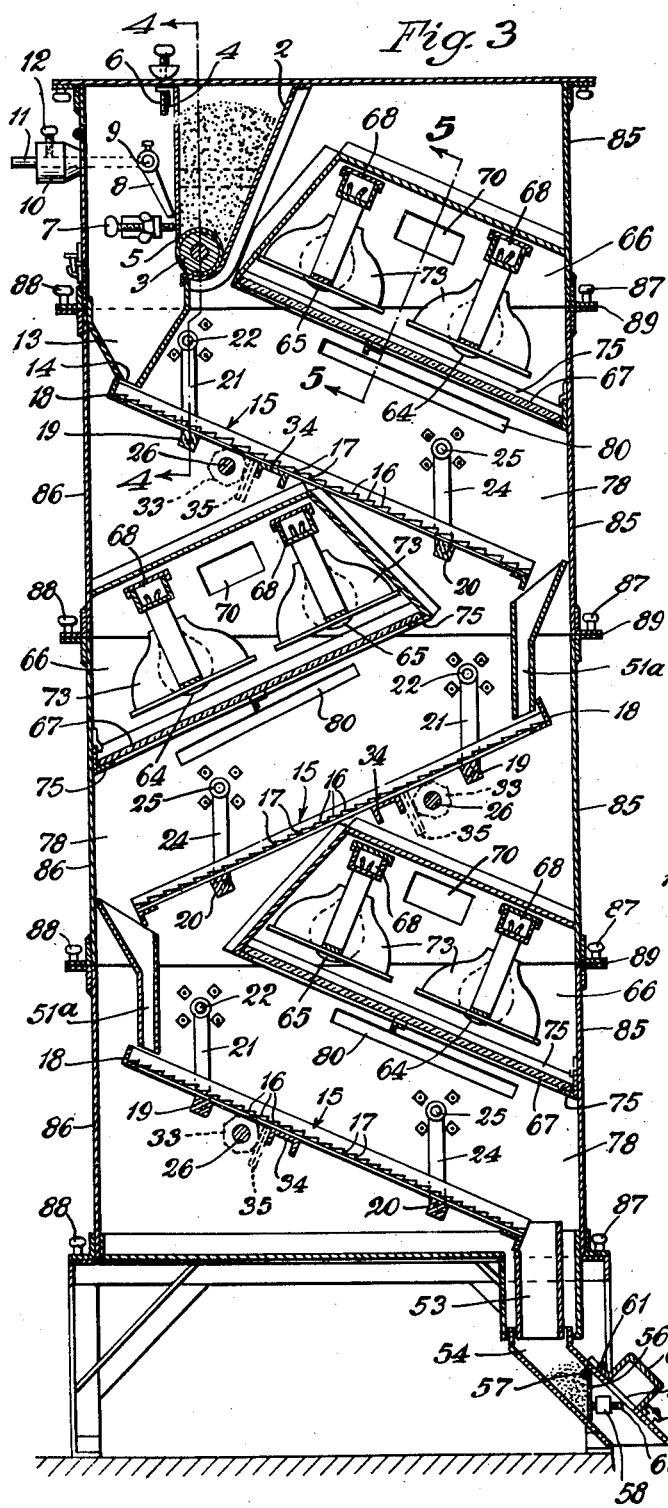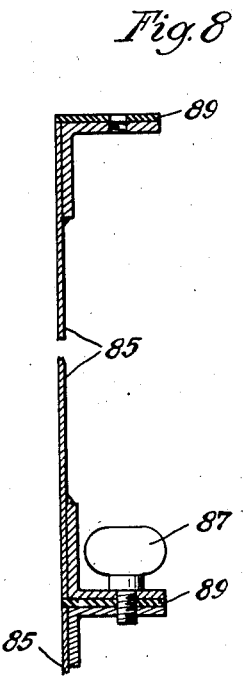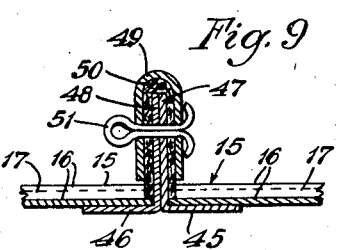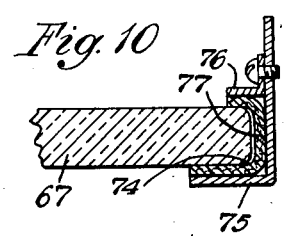

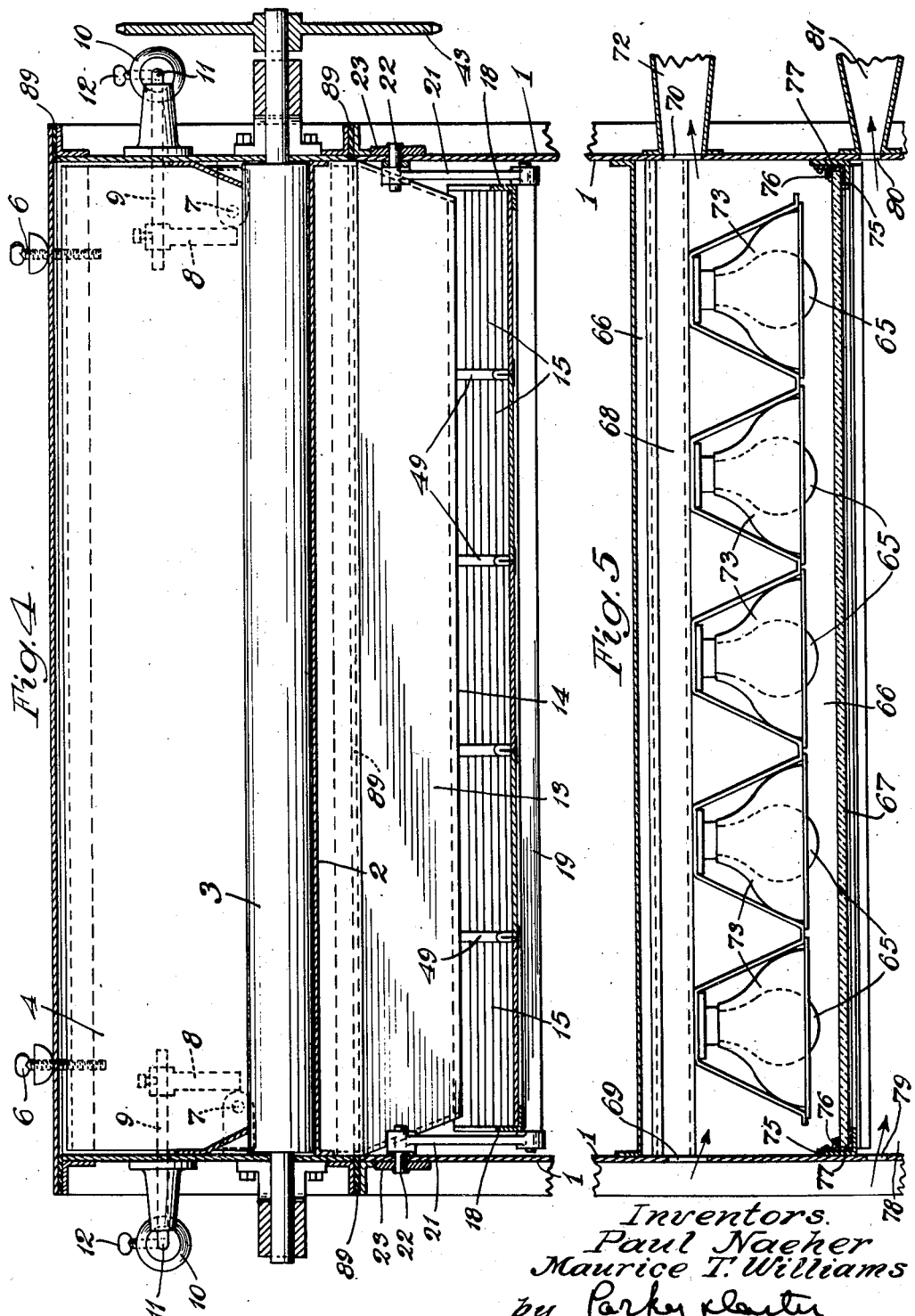

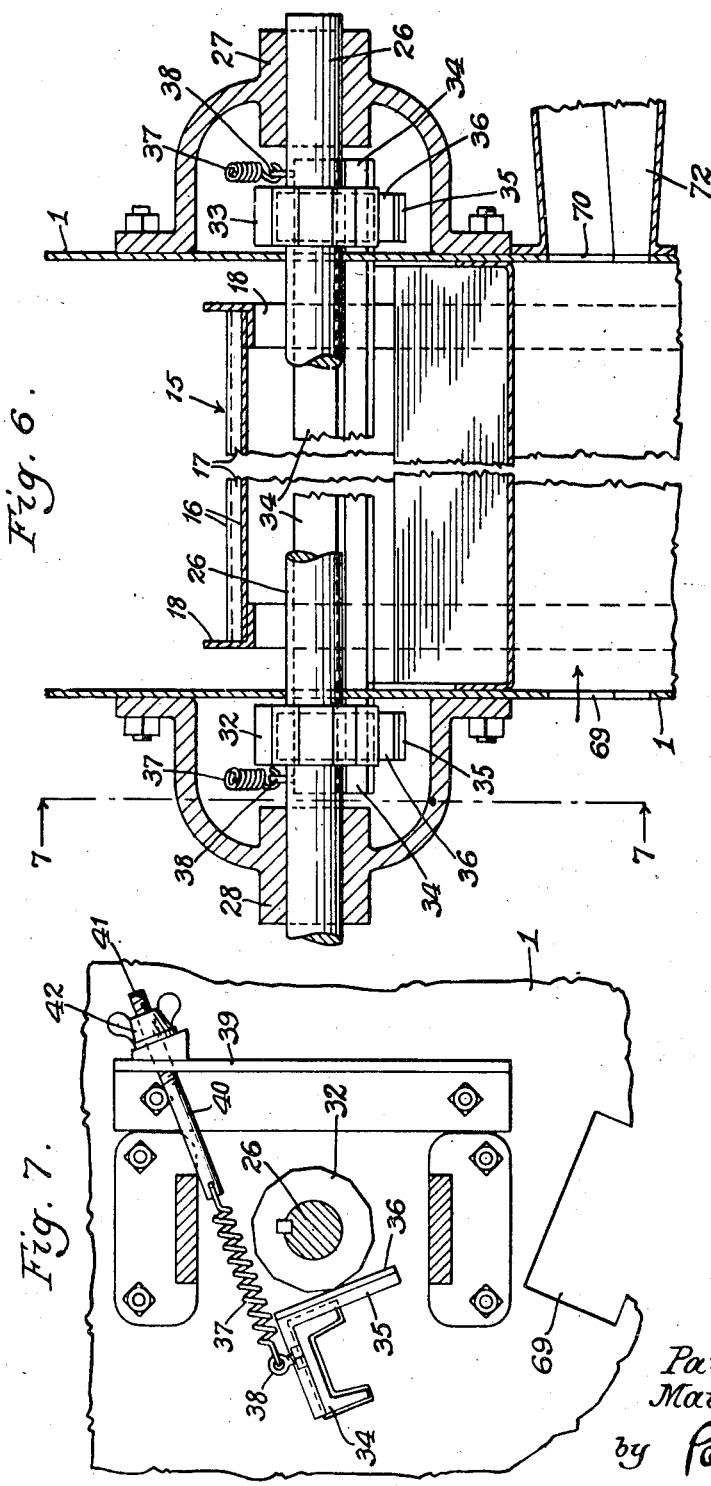

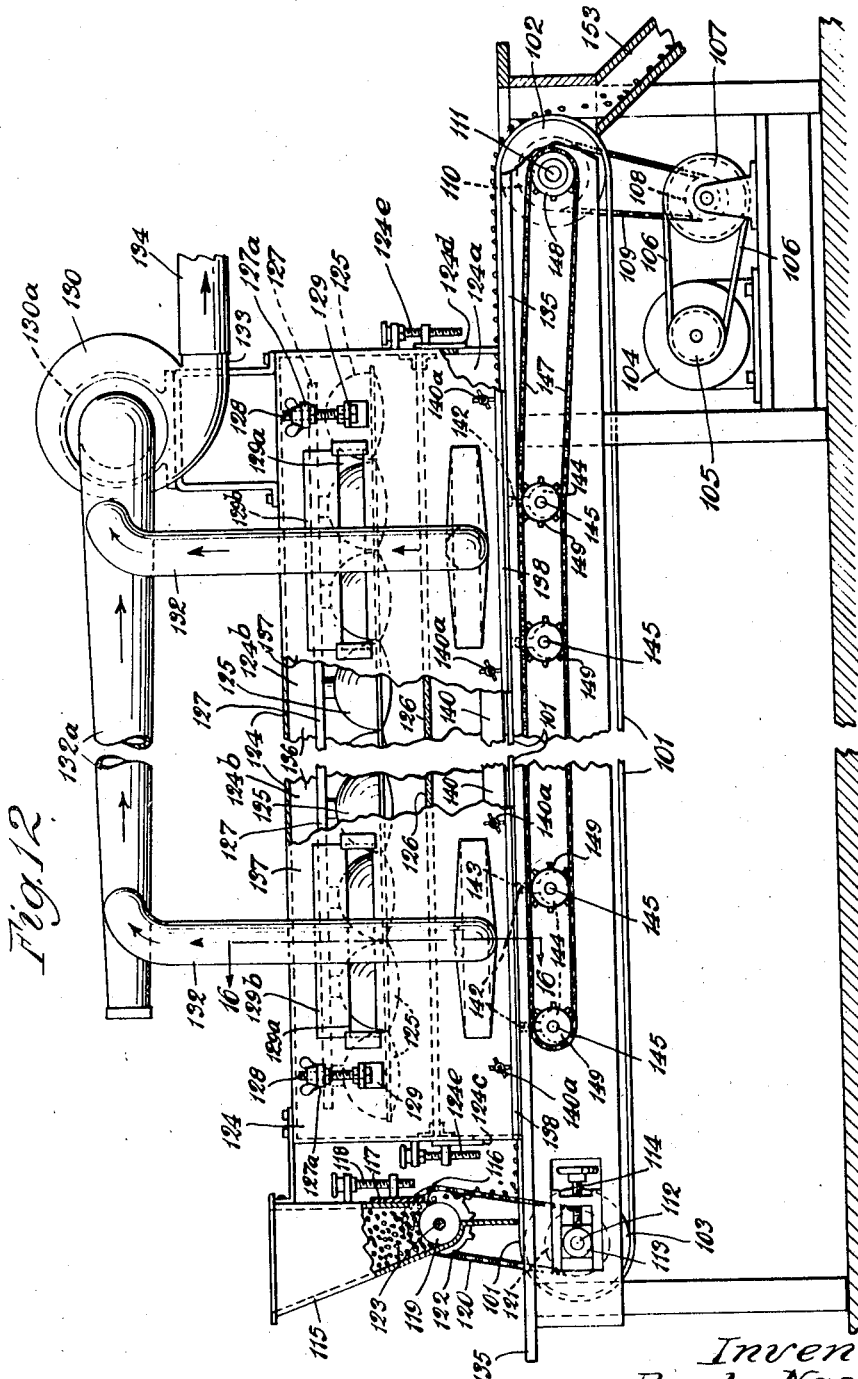

Sept. 30, 1947.　　P. NAEHER ET AL　　2,428,090
INFRA-RED TREATMENT OF CEREAL GERMS
Filed May 17, 1944　　8 Sheets-Sheet 7
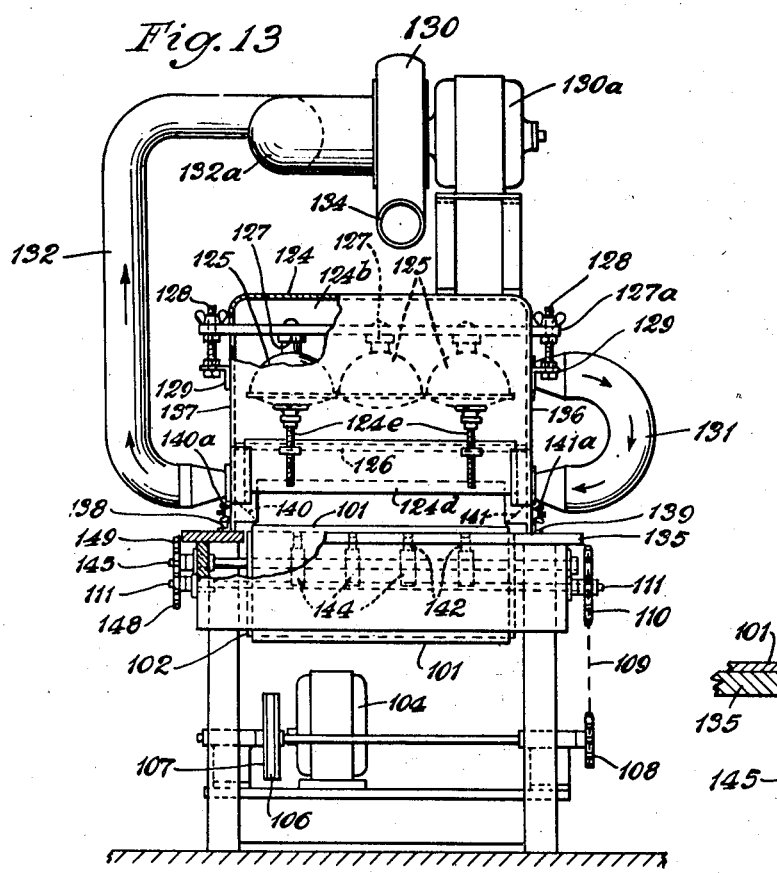
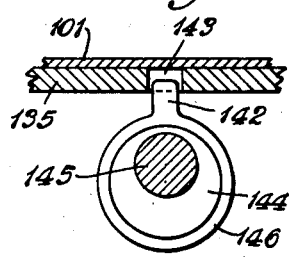
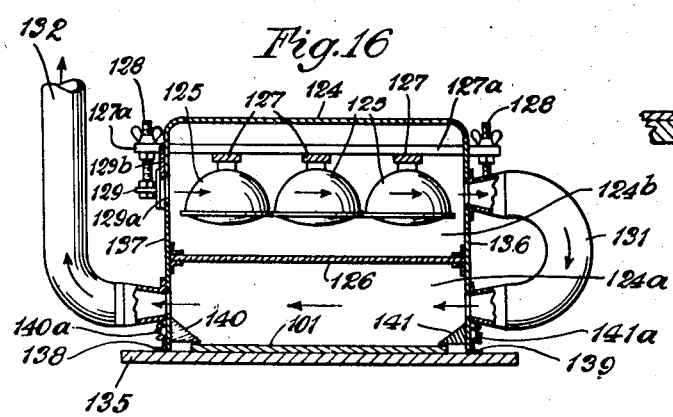
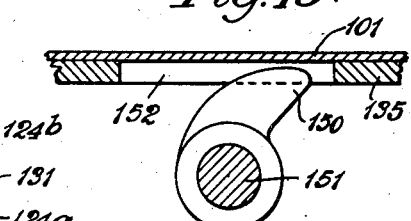
Inventors
Paul Naeher
Maurice T. Williams
by Parker & Carter
Attorneys

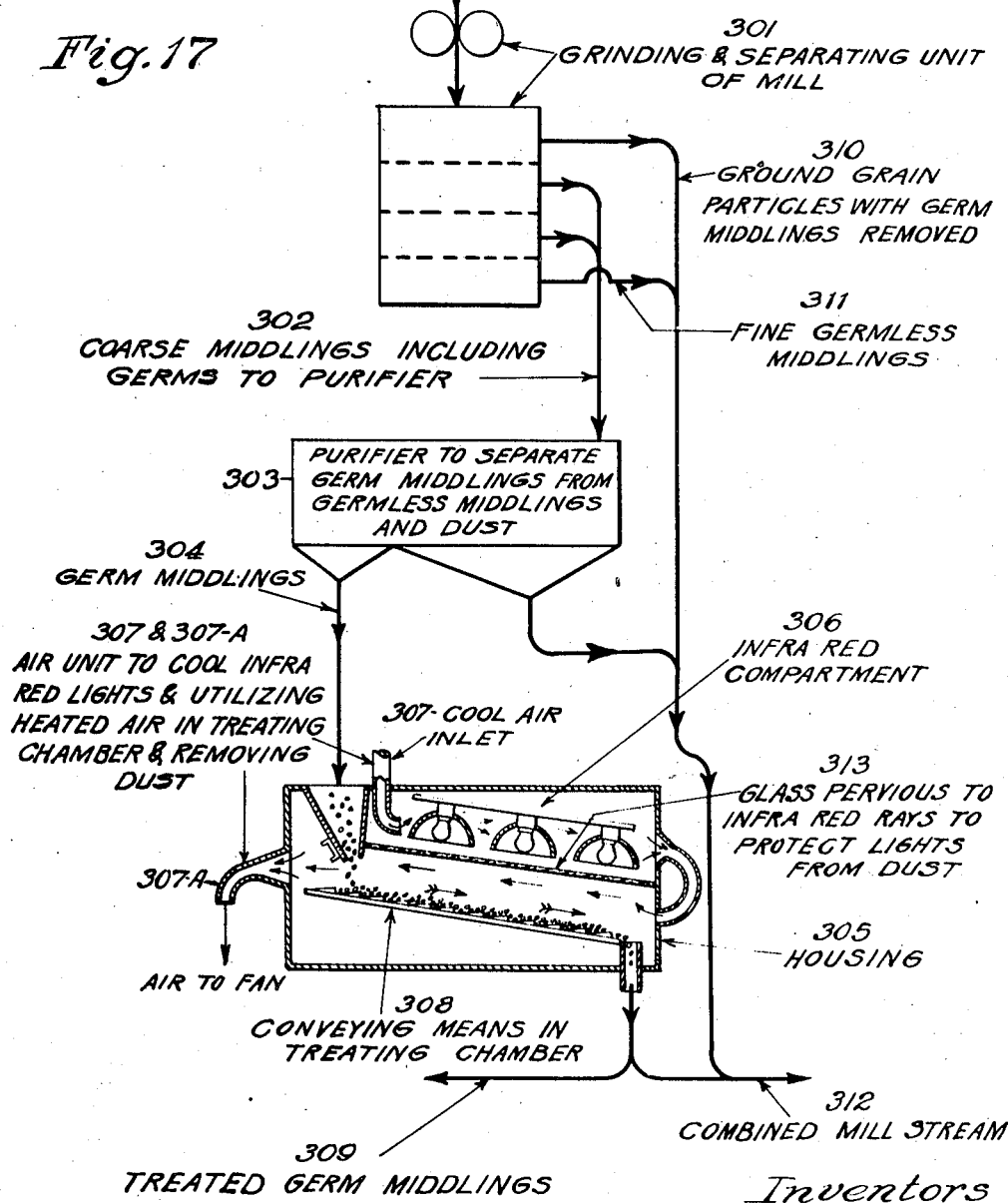

Patented Sept. 30, 1947

2,428,090

UNITED STATES PATENT OFFICE 2,428,090

INFRARED TREATMENT OF CEREAL GERMS

Paul Naeher, Evanston, and Maurice T. Williams, Oak Park, Ill., assignors to B. F. Gump Co., a corporation of Illinois Application May 17, 1944, Serial No. 535,980

2 Claims. (Cl. 241—10)

This invention relates to a method of treating germs, such as the germs of wheat, and has for one object to provide a new and improved method for that purpose.

It has as a further object to provide a method for treating germs by the use of infrared rays and may advantageously be used, for example, in treating wheat germs. In making so-called white flour from wheat, it has heretofore been the practice to remove the wheat germs. These wheat germs contain oil and the particles adhere. Heretofore these germs have been removed to a large extent by running the material containing them, such as the germ middlings, through rollers, whereupon the germs flatten out instead of becoming pulverized, and are then removed by running the material over a sieve. The flat germs being larger than the pulverized material, do not pass through the sieve and are then easily removed. One of the objects of the present invention is to treat these germs so that they can be readily pulverized and become a part of the flour, as they contain vitamins and mineral elements vitally important for the diet of human beings.

The invention has as a further object to provide a method for treating germs of wheat by infrared rays and for removing the moisture therein.

The invention has as a further object to provide a method for treating wheat germs while in the middlings by infrared rays and for removing the dust while the germ middlings are being treated.

The invention has as a further object to provide a method for treating wheat or other germs while they form a part of middlings of crushed wheat by sucessively passing these middlings past infrared lamps and vibrating them while they are passing the lamps.

The invention has as a further object to treat germs by removing moisture, to prevent them from becoming rancid.

The invention has as a further object to provide a method for treating germs or germ middlings by continuously passing them under a series of infrared lamps in an enclosing device having means for removing heat therefrom, and agitating the treated material during this passage, and removing the moisture and dust at points separate from the point where the treated germ material is discharged.

The present application is a continuation in part of our co-pending application Serial No. 406,662, filed August 13, 1941, entitled "Method and apparatus for treating wheat germs" and illustrates a structure applicable for use with our method, described and shown in the co-pending application Serial No. 464,044 filed October 31, 1942, in the name of Paul Naeher and William M. Williams, assigned to the same assignee B. F. Gump Company, said applications having issued on August 15, 1944, as Patents Nos. 2,355,670 and 2,355,671, respectively.

The invention has other objects which are more particularly pointed out in the accompanying description.

The drawings exemplify an apparatus adapted to carry out our method.

The invention is illustrated more or less diagrammatically in the accompanying drawings, wherein:

Figure 1 is a front elevation of one form of apparatus for carrying out the method with parts shown in section;

Figure 2 is an end elevation of the device shown in Figure 1 as seen from the left end;

Figure 3 is a sectional view taken on the line 3—3 of Figure 1;

Figure 4 is a sectional view taken on the line 4—4 of Figure 3;

Figure 5 is a sectional view taken on the line 5—5 of Figure 3;

Figure 6 is a sectional view taken on the line 6—6 of Figure 2;

Figure 7 is a sectional view taken on the line 7—7 of Figure 6;

Figure 8 is a sectional view through one of the removable inspection doors;

Figure 9 is a detailed sectional view of one of the joints between the corrugated plates on the vibrating members;

Figure 10 is a sectional view showing the end of the glass member located in position;

Figure 11 is a view of the upper end of the conduit through which the moisture and heat are withdrawn from the housing, showing the air moving device connected therewith;

Figure 12 is a side elevation of another device which may be employed to practice our invention;

Figure 13 is an end elevation of the device shown in Figure 12;

Figure 14 is an enlarged view showing one form of device for agitating the conveyor and the wheat germs thereon;

Figure 15 is a view showing a modified form of device for agitating the belt and the wheat germs thereon;

Figure 16 is a sectional view taken on the line 16—16 of Figure 12; and

Figure 17 is a flow sheet or diagram illustrating the steps of the method herein described and claimed.

Like numerals refer to like parts throughout the several figures.

For purposes of illustration, as shown in Figures 1 to 11, we have shown one form of apparatus for treating germ middlings. This apparatus comprises a housing 1 containing the various devices for acting upon the germ middlings. These germ middlings are separated from the remainder of the crushed wheat and then are passed through this housing. The germ middlings are placed in a hopper 2 at the top of the housing, which is provided at the bottom with a feed roll 3. One wall 4 of the hopper (see Figure 3) is made to form a feed adjusting member by means of which the feed opening 5 between the member 4 and the roll 3 may be adjusted. The feed adjusting member is moved up or down by means of an adjusting screw 6 so as to vary the size of the feed opening. It is also movable laterally to adjust the size of the feed opening, its lateral movement being limited by the adjustable stop 7.

The wall 4 is pressed toward or against the feed roll 3 by one or more arms 8 mounted on a shaft 9 which has a weight 10 connected therewith by means of an arm 11. This weight is adjustably mounted on the arm 11 by the adjusting screw 12. The material discharged from the hopper 2 passes into a second hopper 13 which has a discharge mouth 14. The hopper 2 and the hopper 13 and discharge mouth 14 preferably extend entirely across the housing.

The germ middlings are discharged in the proper amount from the hopper 13 onto a corrugated vibrating or agitating member 15 which is inclined downwardly from the top or admission end toward the discharge end. There are a plurality of the vibrating or agitating members 15 to which the germ middlings are successively delivered, all of which are similar and all of which are moved or vibrated by similar parts. Since a description of one of these agitating members and associated parts constitutes a description of all of them, we have described one and applied the reference numerals to all of them. For purposes of illustration, we have shown three of these agitating members but any desired number may be used. These vibrating or agitating members are preferably made of corrugated metal, that is, metal having a series of projecting ribs 16 thereon separated by depressions 17. These agitating members are movably mounted in position in any desired manner.

As herein shown, each agitating member is connected to a frame 18 which has beneath it the longitudinal members 19 and 20 which are indicated as bars having rounded ends. The links 21 are mounted upon the rounded ends of the member 19, there being one link at each side of the housing, as shown for example in Figure 4. These links 21 are mounted upon pins 22 fastened in position in any desired manner, as for example by projecting through the housing and through the members 23 attached to the housing. There are attached to the rounded ends of the member 20, the links 24, one at each side of the housing, and these links are mounted upon pins 25 similar to the pins 22, and supported in a similar manner. The links 21 and 24 have a rocking connection with the members 19 and 20 and the pins 22 and 25 as the agitating members 15 are moved, to cause the germ middlings to travel therealong. Some suitable means is provided for vibrating the agitating members 15.

As herein shown, there is provided under each agitating member, and extending therealong, a shaft 26 which extends through the housing and which is mounted in bearings 27 and 28 attached to the outside of the housing (Figure 6) and which is rotated in any desired manner, as by means of a belt 29 passing over sprocket wheels 30 and driven by a motor 31. The shaft of the motor is connected by a belt 31a with a pulley 31b on a shaft 31c which is provided with a sprocket wheel 31e over which the belt 29 passes. Each shaft 26 is provided with two flat faced wheels 32 and 33 keyed thereto (see Figures 3 and 6), which are preferably on the outside of the housing. Attached to each agitating member is a longitudinally extending member 34 which has at each end opposite the flat faced wheels 32 and 33 the engaging members 35, preferably provided with a face 36 of some material such as rawhide. The ends of the members 34 extend through enlarged openings in the housing. When the flat faced wheels are rotated the flat faces engage the engaging members 35, that is the rawhide face thereof and move or vibrate the agitating members.

There are springs 37 connected with the members 34 at each end in proximity to the flat faced wheels 32 and 33 (see Figures 6 and 7) which maintain the engaging devices 35 in contact with the flat faced wheels. The wheels move the agitating members in one direction and the springs 37 move them back in the other direction. These springs 37 have one end fastened to the members 34 by the fastening devices 38 and the other ends fastened to fixed parts 39 of the housing. As herein shown, each spring is connected with a rigid member 40 which has a screw threaded end 41, there being an adjusting nut 42 on the screw threaded end so that the tension of the spring may be adjusted (Figure 7) as desired.

The feed roll 3, as herein shown, is driven from the shaft 26 of the upper agitating member. This shaft (see Figures 1 and 2) has a sprocket wheel 42a on the end opposite to that provided with the sprocket wheel 30. There is a sprocket wheel 43 connected with the shaft of the feed roll 3 and there is a belt 44 connecting these two sprocket wheels so that when the shaft 26 is rotated, the feed roll is rotated.

As the material passes along the agitating members, it is heated, preferably by a series of infrared lamps. The agitating members are made of metal and are heated by these lamps and, in order to prevent them from getting out of shape, they are made in a number of sections. In the construction herein shown, each of the corrugated metal portions of the agitating members is made in five sections. (Figure 4). These sections may be arranged in any desired manner, but we prefer to have their edges connected together. In Figure 9 we have shown one connecting means. In this construction there are two angle irons having two members 45 and 46 which engage the lower face of the abutting sections. The other members of these angle irons 47 and 48 project up between the edges of the two sections. A U-shaped connecting member 49 fits down over the parts 47 and 48. There is a fire-resisting packing 50 interposed between the U-shaped connecting member 49 and the parts 47 and 48. The parts are all fastened together by the fastening devices 51. The fire-resisting packing fits tightly against the upper corrugated surface engaging the surface of the ribs and also the surface of the depressions so that there can be no leakage of the material, either from one section to the other or downwardly from the section.

As the agitating members are vibrated, the material passes therealong and is conveyed from one agitating member to another by the connecting conveying members 51a. The material from the last or bottom agitating member is discharged into two hoppers 52 and 53 and is discharged by these hoppers into the spouts 54 and 55, and passes from these spouts into any suitable storage device desired. Each of these spouts is provided with a hinged door 56 which is hinged at 57 and which normally extends across the spouts. (Figure 3). Attached to the rear of each of these doors is an adjusting weight 58. Each spout is provided with an opening 59, each of which is covered by a hinged receptacle 60, hinged at 61, and which has a fastening member 62 at the opposite side. The receptacles 60 provide spaces into which the weights 58 and the adjusting screws 63, upon which they are mounted, may be received as the doors open. By loosening the fastening devices 62, the receptacles 60 may be moved about their hinges so as to give access to the weight for adjustment purposes.

The material only passes these doors when there is enough material above the doors, the weight of which is sufficient to overcome the resistance of the weights 58. The doors are then opened to let some of this material pass out. When the amount of material above the doors is reduced so that the weight thereof is not sufficient to overcome the weights 58, these weights cause the doors to close. It will be seen that by this arrangement the doors when closed and the material above the doors, when the doors are open, prevent air from passing up through these spouts into the housing.

The material as it passes along the agitating members 15 is subjected to the light and heat of a series of electric infrared lamps. These lamps may be arranged in any desired manner capable of securing the result. As herein shown, there is associated with each agitating member 15 a plurality of infrared lamps preferably arranged to direct the rays directly down upon the material passing along the agitating members. In the particular construction shown, each agitating member is provided with two rows of lamps 64 and 65. These lamps are enclosed in a closed receptacle 66, the bottom of which is formed of glass or other suitable ray transmitting member 67 of the type which does not greatly impede the infrared rays of the lamp. The remaining portion of the receptacle may be formed in any desired manner, as by means of sheet metal fastened inposition to the walls of the housing. The electric wires for the lamps preferably pass to each row of lamps through separate conduits 68 (Figures 3 and 5). As these lamps develop considerable heat, some means is provided for removing this heat. Each of these receptacles 66 has an air admission opening 69 at one side of the housing and an air discharge opening 70 at the other side of the housing, which openings connect with the space in which the lamps are located. Each of the openings 70 connects with an exhaust conduit 72 (Figure 1), which is connected to some suitable exhaust or air-moving device so that the heat can be withdrawn from the lamp receptacles.

Each of the lamps is provided with a reflector 73 which directs the rays through the glass member 67 onto the material passing along the agitating member 15. This glass member is preferably provided with rounded corners 74 (Figure 10) which tends to eliminate cracking of the glass, and is held in place in any desired manner. As herein shown, there is at each edge a holding member 75 with a clamping member 76 attached thereto. There is preferably an asbestos or other fire-resistant air tight packing 77 surrounding the edge of the glass so as to provide a tight fit to the glass in its supporting means.

When the material is subjected to the infrared lamps, it is dried, moisture being librated therefrom and passing into the chambers 78, also the material is somewhat dusty and dust is produced by the friction of the material as it passes along the corrugated agitating member. This dust must be removed or otherwise it will settle on the glass member 67 and interfere with the action of the lights.

One of the purposes of having the glass members 67 surrounded by the frame lined with asbestos is to secure an air-tight arrangement so that none of this dust can get into the lamp receptacles 66. Some means is provided for removing this moisture and dust. As herein shown, each chamber 78 is provided with an air inlet 79 and an air outlet 80 (Figures 2 and 5). The air outlet is connected by an exhaust conduit 81 with a suitable exhaust or air-moving device which removes the heated air, moisture and dust. In addition to the reasons heretofore set out, it is necessary to remove the heated air so that the material passing through the device will not become heated a sufficient amount to injure it.

It will be understood that the method may be employed with substantial flexibility and may include for example, a plurality of passes of the material through a single heated area, a passage of the material through a succession of heated areas, or a passage of the material through a single heated area of substantial length, or a heated area which is effective throughout a substantial distance of movement of the material.

Thus in the structure of Figures 1 to 11, we have illustrated a sequence of conveyors or agitators and a plurality of heat sources.

The exhaust conduits 72 and 81 may lead to any desired point. As herein shown, they are connected to a conduit 82 (Figure 1) which is connected to an air-moving device 83 (Figure 11) which discharges it into a conduit 84. It can then be disposed of in any desired manner. The exhaust conduits 72 are each provided with a damper or valve 72a and the exhaust conduits 81 are each provided with a damper or valve 81a. These valves may be maintained in any desired position so as to adjust or vary the effective size of the conduits and thereby control the speed of withdrawal of the heat, moisture and dust from the housing. By connecting the exhaust conduits 72 and 81 with the conduit 82, some of the dust will remain in the conduit and settle to the bottom. There is a removable bottom 85a by means of which this dust may be removed and saved.

The housing may be of any desired form and of any desired material. It is preferably made of sheet metal sections connected together by angle connections or by any other manner, and has removable doors 85 at the front and 86 at the back. These doors are held in position by the holding devices 87 and 88. By means of these doors access can be easily and quickly secured to any of the apparatus on the inside of the housing. The doors and the sections of the housing are preferably provided at their edges with a suitable packing 89 so as to provide a tight housing and prevent the leaking or admission of air into the housing except as it comes in through the inlet openings 69 and 79 in response to the air-moving device.

The member 67 is referred to as a glass member but it is, of course, evident that it may be of any other suitable material, transparent or translucent, which transmits infrared rays.

In the construction herein shown, there is provided a conveyor 101 which passes over the rollers 102 and 103 and which is moved by means of a motor 104. This motor is preferably connected to the conveyor by a variable speed mechanism of any desired form. As herein shown, the motor is provided with a pulley 105, over which runs a belt 106 which passes over a pulley 107. Connected with the pulley 107 is a pulley 108. A belt 109 passes over this pulley and engages a pulley 110 on a shaft 111 of the roller 102, over which the conveyor 101 passes. The shaft 112 of the roller 103 is mounted in an adjustable bearing 113 which is adjusted by means of a screw 114, so as to vary the tension of the conveyor.

The wheat germs or the middlings containing the wheat germs are placed on the conveyor in any desired manner. As herein shown, there is a hopper 115 into which the wheat germs, or the middlings containing the wheat germs, are placed. This hopper is provided with an adjustable feed mechanism comprising a feed or discharge opening 116 and a movable control member 117 for said opening which is adjusted to vary the size of the opening by the adjusting screw 118. There is a roller 119 opposite the opening 116 which insures the discharge of the material through this opening, the material being deposited upon the conveyor 101. This roller is operated by means of a belt 120 which passes around a pulley 121 on the shaft 112 of the roller 103 and around a pulley 122 on the shaft 123 of the roller 119.

Located above the conveyor 101 is a housing 124, open at the bottom and containing a series of infrared lamps 125. The housing 124 is supported in any desired manner and the conveyor 101 acts as a closure for the open bottom of the housing and is moved along under the housing, with the material to be treated thereon so that this material is subjected to the rays of the infrared lamps. There is sufficient room between the lower edges of the front and rear walls of the housing and the top of the conveyor to permit the material on the conveyor to pass these edges. The lower portions 124c and 124d of the front and rear walls of the housing 124 are adjustable with relation to the conveyor by means of the adjusting screws 124e so that they may be properly adjusted to clear the material on the conveyor passing thereunder and to also provide, if desired, a sufficient space between the lower edges of these walls and the top of the material on the conveyor to provide a natural ventilation of the chamber 124a as hereinafter set out. The lower edges of the side walls of the housing are arranged to prevent the material on the conveyor from leaving the conveyor at the sides as the conveyor moves along the housing. When in operation the housing receives considerable dust and moisture which must not be permitted to settle upon the infrared lamps as this would greatly reduce the efficiency thereof. There is, therefore, provided an infrared ray transmitting dust shield 126 between the infrared lamps 125 and the conveyor 101, which divides the housing 124 into two chambers, one chamber 124a, which is just above the conveyor 101, and the other chamber 124b, which contains the infrared lamps, so that the lamps are practically in a sealed chamber 124b formed by the upper part of the housing 124 and the shield 126 and, therefore, out of the dust and moisture contained in the chamber 124a.

The infrared lamps 125 are preferably adjustable vertically to vary their distance from the conveyor 101. As herein shown, this adjustment is secured by mounting these lamps upon supports 127, 127a, which are adjustable vertically by means of the adjusting screws 128 which are connected to the supports and to a fixed member 129 attached to the walls of the housing 124.

The infrared lamps develop heat which must be removed from the chamber 124b to preserve the lamps and their connections. This is accomplished by drawing air from the outside atmosphere through the air intake 129a by a suction fan 130 operated by a motor 130a thereby continually replacing the heated air in the chamber 124b by cooler outside air. This heated air is utilized for heating and drying the wheat germs in chamber 124a. The heated air passes out of the chamber 124b and into the chamber 124a through the connecting pipe or pipes 131 and contacts the germs on the conveyor 101. The heated air, dust and moisture in the chamber 124a passes out of said chamber through the pipes 132 into the pipe 132a which connects with the suction fan 130. The size of the air intake openings 129a may be varied by means of the shutters 129b.

The discharge 133 of the fan is connected with a pipe 134 which may lead to any point desired, such as a dust collector. After the dust is removed, the heated air can be utilized in any manner desired, as for example, for heating a room.

Some means is provided for agitating the material on the conveyor 101 so as to pass it along under the infrared lamps. The rays from the lamps will contact all parts of the various particles of the material on the conveyor.

The conveyor may be supported in any desired manner and the manner of supporting it will depend in a large measure on the material from which the conveyor is made. In the drawings, we have shown one form of conveyor which is supported by a support 135, the conveyor running along this support so that it is kept substantially straight and level throughout the portion of its travel beneath the infrared lamps.

The side walls 136 and 137 of the housing are supported upon the support in any suitable manner, as by the angle members 138 and 139.

Located on the interior of the housing are the guides 140 and 141 which are preferably adjustably fastened in position, as by the adjustable fastening devices 140a and 141a which work in slots in the side walls 136 and 137. These guards have inclined faces and project inwardly beyond the edges of the conveyor 101. They insure the material being maintained on the conveyor 101.

A series of agitating members 142 are arranged at intervals along the conveyor, opposite openings 143 in the support 135 and through which the lower face of the conveyor is exposed, as shown in Figures 12 and 14.

The agitating members may be moved in any desired manner as, for example, by means of eccentrics 144 mounted on shafts 145, there being eccentric rings 146 to which the agitating members 142 are connected. As the shafts 154 are rotated, the agitating members 142 move up and down engaging the conveyor 101 and moving it so as to agitate the wheat germs thereon to turn them so that the rays from the infrared lamps contact with all parts of the wheat germs to insure their being thoroughly treated.

The shafts 145 are rotated in any desired manner. As herein shown, they are driven by a belt 147, preferably a sprocket chain driven from a sprocket wheel 148 on the conveyor shaft 111. This sprocket chain has a driving connection with the driving sprockets 149 on the shafts 145.

It will thus be seen that as the shafts 145 are rotated the agitating members 142 are moved up and down so as to engage the conveyor and move it to move the wheat germs to various positions so that the infrared rays will strike all of the surface areas thereof.

There is illustrated in Figure 15 another form of agitating device which consists of an agitating member in the form of a cam 150 mounted on the shaft 151. The support 135 is provided, in this case, with elongated openings 152 in which the cams 150 move and through which the bottom of the conveyor is exposed. There will, of course, be a series of these agitating devices located at proper distances along the conveyor.

The oil of the wheat germs, which causes the particles of the wheat germs to cohere when passed through the rollers, has the moisture removed by this treatment so as to change the character and condition of the germs from an adhering mass, the particles of which stick together to form flattened pieces, to a friable condition where the particles are reduced to a powder when passed through the rolls so as to become part of the flour from which bread is made. The treated material passes into a chute 153 and is delivered to any point desired.

Figure 17 is a typical flow sheet illustrating a milling method or series of milling steps including the steps and the method herein claimed. The steps are indicated by numerals 300 to 313 inclusive. 300 indicates flow of whole grain to the mill cleaned, scoured and tempered. 301 indicates the grinding and separating unit of the mill. It will be understood that this illustrates diagrammatically any suitable form of mill which treats the grain. 302 indicates the course of coarse middlings including germs to the purifier. 303 indicates the purifier which separates the germ middlings from the middlings and dust without germs. 304 indicates the flow of germ middlings to the germ drying and treating chamber which includes the air unit 307 to furnish cool air, the discharge unit 307A through which the heated air is discharged. The air cools the infrared lights and that air is passed through the chamber to assist in heating and drying the germ middlings. 305 indicates the housing and 306 the infrared compartment wherein the infrered lights are located to treat the germ. 309 indicates the flow of treated germ middlings. 310 indicates the flow of ground grain particles, the germ middlings having been removed. 311 shows the flow of fine germless middlings. The germless middlings and dust from the purifier also join the ground grain 310 just as did the fine germless middlings 311. The arrow discharge from the treating chamber indicates that the treated germ middlings may be discharged on the path 309 separately or if desired, may be combined with the mill stream at 312. 313 indicates the glass which is pervious to infrared rays to protect the lights from dust.

It will be understood, of course, that the entire process may take place in one building and at one place. It will also be understood that the germ middlings resulting from the usual grinding and treating might be separately removed, separately treated and then mixed with the product of a mill or separately used without mixing with the product of a conventional mill.

The use and operation of our invention are as follows:

Broadly, stated, our method involves the subjection of germs or germ substances such as germ middlings to infrared light in order to dry the germ substances and to render them friable so that if desired it can be returned to the milling system. Also it is rendered sufficiently friable to be directly ground and put back, as a ground product, into the flour stream. This must be done without substantial damage to the vitamin contents of the germ substances. As is known, the germ contains vitamin $B_1$ and $B_2$ and other vitamins. It is also important that the consequent product be not damaging to the baking qualities of the flour. We find that, by employing our invention, we produce a friable product, which, however, has not lost any substantial proportion of the vitamin content or the desirable volatiles.

In the use of the mechanism above described, we control the following factors:

(a) The temperature to which the substance is raised;
(b) The time during which the substance is subjected to such temperature; and
(c) The length of the path along which it travels during its subjection to infrared radiation.

Thus we can vary the rate of feed of the material through or along any conveying and agitating mechanism we employ. We can make more than one pass or movement of the material through a given heating mechanism. We can vary or control the current of drying air which we employ. We can vary the length of the path of the material through the heated area. We also find it important to cool the heated germ material. Where a plurality of passes are employed, it may be advantageous to cool the product between passes by any suitable means for example by subjecting it to a stream of cooling air. Also it is advantageous to cool the product as soon as it leaves the zone of treatment if a single pass is employed.

We have found one practical range, in which the material is given a single pass lasting in the neighborhood of approximately five minutes and a temperature maximum of about 120° F. However, our experience indicates that, especially where the time of subjection is shortened, the material may be subjected to substantially higher temperatures. Vitamin $B_1$ is more volatile than vitamin $B_2$ and some loss takes place, if the material is subjected to high temperatures over a long period of time. We find, however, that "flash" heating is practical, in which the material is subjected to temperatures even higher than 212° F., if the time of subjection is short, and if the material is promptly cooled after removal from the zone of treatment.

The prompt cooling is highly advisable as otherwise the effects of the heating are cumulative. It is also highly important that the product be prevented from searing or scorching or toasting.

Referring to the above described structures and their use, the germ to be treated by the apparatus may be separated from the crushed seed or grain such as wheat in any desired manner. We prefer to take what is known as germ middlings for treatment, although we do not limit ourselves to treating such germ middlings.

The material to be treated is delivered to the hopper 2. The motor is operated so as to rotate the feed roll 3. The material then passes out through the space between the member 4 and the feed roll to the hopper 13 and out of this hopper onto the corrugated agitating member 15 and travels from one agitating member 15 to the other, and is finally discharged from the apparatus through the spouts 54 and 55 into any suitable receptacle or storage device. These agitating members are vibrated or rocked by means of the flat-faced wheels 33, engaging the engaging members 35 so as to cause the agitating members to be reciprocated, the springs 37 maintaining the engaging devices in connection with the flat-faced wheels. This causes the material to gradually pass along the agitating devices.

The infrared lamps are in operation and they direct the rays upon this material as it passes along the corrugated agitating devices so as to dry the germs. These germs, after they may be dried, are reduced to flour and by being thus dried and treated by the infrared lamps, will pulverize and not flake during the grinding operation. Thus we produce a friable end product.

When treated as herein set out, the oil of the wheat germs has moisture removed therefrom so as to change the character and condition of the germs from an adhering mass, the particles of which adhere to form flattened pieces when the germs are passed through the rolls, to a friable condition where the particles are reduced to a powder when passed through the rolls, and may be returned to the flour so as to become a part of the flour from which the bread is made, or may be otherwise used. The length of time during which the material is exposed to the lamps may be varied by speeding up or slowing down the vibrations of the agitating members, by speed-up or slowing down the rotation of the flat-faced wheels 32. It is, of course, evident that any number of the agitating members or lamps may be used and where a few of them only are used, the material may be passed through the apparatus a plurality of times, if necessary to get the desired results. It may be desirable also to pass the treated material through the crushing rollers a plurality of times.

Heated air is removed from the lamp compartment 66 through the exhaust conduit 72, and the moisture, heated air and dust are removed from the chamber 78 through the exhaust conduit 81, and are directed by the air-moving device into the conduit 84, and may be then directed to any point desired. By regulating the valves 72a and 81a the temperature of the mateiral on the agitating members may be varied as required to secure the desired result. The dust taken from the chamber 78 may be added to the flour. The heat from the lamp receptacle and the chamber 78 may in the wintertime be used in heating the building or for other heating purposes.

When the germ middlings are treated, as herein described, they become of a lighter color. By treating the wheat germs, as herein set out, substantially all of the germs thus treated are recovered so as to become a part of the flour. By the use of this device, the flour mills can produce uniform flour during all weather conditions. The action of the present device also improves the color of the material acted upon.

We have described in detail a particular construction or apparatus for treating the germs of wheat, either separate from or as a part of the middlings, but it is, of course, evident that the apparatus may be varied greatly in form, construction and arrangement without departing from the spirit of the invention as embodied in the claims hereto appended and we, therefore, do not limit ourselves to the particular construction shown.

In the form of Figures 12 and following, we illustrate the employment of a continuous conveyor or belt with means for agitating the belt and improved means for employing the air which is heated in the lamp containing compartment for drying the material undergoing treatment on the conveyor 101. As shown in Figure 16 outside air passes to the space above the pane 126 and is heated by the lamps 125. This air is withdrawn along the duct 131 and therefore serves as a cooling and dust removing agent so far as the space about the lamps is concerned. The air thus heated, flows through the space between the pane 126 and the conveyor 101 and eventually out along the duct 132 to assist in trying the material under treatment and also withdraws dust and moisture.

Whereas we have discussed our method as applied to wheat and wheat germs, it will be understood that it is equally applicable to any germ or germ products in which the drying of the product is advantageous. Whereas the above mechanism has been described as used in connection with treating wheat germs, it will be understood that it is intended to be employed with other granular material, such as the germs of other grains or seeds, meal containing various germs, and entire grains or seeds.

An essential characteristic of our method is to so control the subjection of the wheat germs or germ middlings to infrared radiation as to remove a substantial proportion of the moisture from the wheat germs or germ middlings, without roasting or toasting the wheat germs or middlings, and without so changing their state or condition as to damage their vitamin or other chemical content or to render them less desirable for the uses to which wheat germs and middlings are put. A wide range of temperature control may be employed. In general, a temperature of less than 100 degrees F. is too low to obtain adequately rapid drying. Where the wheat germs or middlings are subjected to a temperature of the general range of from 100 to 120 degrees F., there is little probability of scorching or of damage to wheat germs, especially if they are maintained in constant motion or agitation, as in the various apparatuses illustrated herein, and are promptly and in general continuously removed from the zone of treatment. As the upper range of temperature is raised, the importance of agitation and movement, and the importance of timing, increases. Where flash heating is employed and the material is subjected to infrared radiation for only a short period, temperatures of as high as 180 degrees F. or higher, may be tolerated. However, we find it more desirable to hold the upper limit somewhat lower and to subject the wheat germs or germ middlings somewhat longer to the radiation. It will be understood that where in the claims we use the term substantially free or substantially freed from moisture, we wish this term to be interpreted as indicating a sufficient or adequate freedom from moisture, it being understood that the germs or germ middlings are never, under any normal condition, completely freed from moisture. It will be understood that the temperature ranges indicate the temperatures or ranges of temperatures reached by the wheat germs or germ middlings themselves and not, necessarily, the air temperature or the temperature of the space through which the wheat germs or germ middlings pass. It will be further understood that where we employ the term "wheat germs" or "germ middlings" we wish to include equivalent substances such as the germs of other seeds and grains.

We claim:

1. The method of treating germs in a flour milling system which includes separating and removing the germs from the grains, subjecting the separated germs or germ middlings in an open chamber to infrared radiation sufficient to heat said germs under such conditions and for a sufficient period of time to remove substantially all of the moisture from said germs and to alter them to a friable condition without substantially altering the vitamin or mineral components, and thereafter returning the dried germs to the grain material passing through the milling system.

2. The method of treating germs in a flour milling system which includes separating and removing the germs from the grains, subjecting the separated germs or germ middlings in an open chamber to infra-red radiation sufficient to heat said germs under such conditions and for a sufficient period of time to remove substantially all of the moisture from said germs and to alter them to a friable condition without substantially altering the vitamin or mineral components, thereby putting them in a condition in which they may be returned to the grain material passing through a milling system, and removing said treated germs or germ middlings from said open chamber.

PAUL NAEHER.
MAURICE T. WILLIAMS.

REFERENCES CITED

The following references are of record in the file of this patent:

UNITED STATES PATENTS

| Number | Name | Date |
|---|---|---|
| 2,248,526 | Francois | July 8, 1941 |
| 2,235,748 | Hukill | Mar. 18, 1941 |
| 663,418 | Cook | Dec. 11, 1900 |
| 997,016 | Slaybaugh | July 4, 1911 |
| 2,031,086 | Woodruff | Feb. 18, 1936 |
| 2,059,835 | Worthing et al. | Nov. 3, 1936 |
| 1,021,119 | Wallis | Mar. 26, 1912 |
| 1,493,392 | Ryle | May 6, 1924 |
| 876,662 | Simons | Jan. 14, 1908 |
| 2,085,421 | Donk | June 29, 1937 |
| 1,981,318 | James | Nov. 20, 1934 |
| 2,349,300 | Olsen | May 23, 1944 |

OTHER REFERENCES

"Radiant Heat and Its Application," by James D. Hall, pages 213 to 217 of Technical Association Papers, 25th Series, 1942. (Copy available in Div. 49.)